US008669681B2

(12) United States Patent
Kaiser et al.

(10) Patent No.: US 8,669,681 B2
(45) Date of Patent: Mar. 11, 2014

(54) CONDUCTIVE CONNECTION FOR BAR-WOUND STATORS

(75) Inventors: Edward L. Kaiser, Orion, MI (US); Peter Bostwick, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 718 days.

(21) Appl. No.: 12/778,190

(22) Filed: May 12, 2010

(65) Prior Publication Data

US 2011/0278972 A1 Nov. 17, 2011

(51) Int. Cl.
*H02K 11/00* (2006.01)
*H02K 5/22* (2006.01)
*H02K 3/12* (2006.01)

(52) U.S. Cl.
CPC ... *H02K 5/22* (2013.01); *H02K 3/12* (2013.01)
USPC ............. 310/71; 310/179; 310/180; 310/184; 310/194; 310/201; 174/74 R; 174/87; 174/94 R

(58) Field of Classification Search
USPC ................... 310/71, 179, 180, 184, 194, 201; 174/74 R, 87, 94 R
IPC ........................................................ H02K 11/00
See application file for complete search history.

(56) References Cited

U.S. PATENT DOCUMENTS

| 1,649,923 | A | * | 11/1927 | Post ................................. 174/93 |
| 4,227,103 | A | * | 10/1980 | Humes et al. ................... 310/71 |
| 4,328,438 | A | * | 5/1982 | Zolman ...................... 310/68 R |
| 5,095,178 | A | * | 3/1992 | Hollingsworth ............ 174/94 R |
| 5,309,054 | A | | 5/1994 | Yamamoto et al. |
| 5,493,069 | A | * | 2/1996 | Conti .......................... 174/94 R |
| 5,642,852 | A | * | 7/1997 | Suzuki et al. ............... 228/110.1 |
| 5,825,109 | A | * | 10/1998 | Jeske .............................. 310/71 |
| 6,124,655 | A | * | 9/2000 | Jeske .............................. 310/71 |
| 6,459,177 | B1 | * | 10/2002 | Nakamura et al. ..... 310/216.136 |
| 2004/0080222 | A1 | * | 4/2004 | Edrington ....................... 310/71 |
| 2006/0208584 | A1 | * | 9/2006 | Kirkman et al. ................ 310/71 |
| 2007/0007843 | A1 | * | 1/2007 | Matsubara ..................... 310/179 |
| 2009/0121565 | A1 | * | 5/2009 | Ihara et al. ...................... 310/71 |
| 2009/0127948 | A1 | * | 5/2009 | Shimizu et al. ................. 310/71 |
| 2009/0218134 | A1 | * | 9/2009 | Stroh et al. .................. 174/74 R |
| 2010/0102664 | A1 | | 4/2010 | Chen et al. |
| 2011/0278972 | A1 | * | 11/2011 | Kaiser et al. .................... 310/71 |

* cited by examiner

*Primary Examiner* — John K Kim
(74) *Attorney, Agent, or Firm* — Quinn Law Group, PLLC

(57) ABSTRACT

A bar-wound stator, which is connectable to a plurality of fixed terminal points, includes a plurality of stator teeth and a plurality of magnet wires. Each of the plurality of magnet wires has a winding portion wound about at least one of the plurality of stator teeth and a junction portion extending away therefrom. A plurality of flexible leads each have a first portion ultrasonically welded directly to a respective one of the junction portions of the plurality of magnet wires. A second portion of each of the plurality of flexible leads extends flexibly away from the first portion and is configured for attachment to a respective one of the fixed terminal points.

8 Claims, 2 Drawing Sheets

CONDUCTIVE CONNECTION FOR BAR-WOUND STATORS

TECHNICAL FIELD

This disclosure relates generally to stators of electric machines, such as electric motors, electric generators, and electric motor/generators.

BACKGROUND

An electric motor uses electrical energy to produce mechanical energy through the interaction of magnetic fields and current-carrying conductors. The reverse process, using mechanical energy to produce electrical energy, is accomplished by a generator or dynamo. Traction motors used on hybrid, electric, and hybrid-electric vehicles often perform both tasks. Other electric machines, such as motor/generators, combine various features of both motors and generators.

Electric machines may include an element rotatable about a central axis. The rotatable element, which may be referred to as a rotor, may be coaxial with a static element, which may be referred to as a stator. The electric machine uses relative rotation between the rotor and stator to produce mechanical energy or electric energy.

SUMMARY

A bar-wound stator, which is connectable to a plurality of fixed terminal points, is provided. The bar-wound stator includes a plurality of stator teeth and a plurality of magnet wires. Each of the plurality of magnet wires has a winding portion wound about at least one of the plurality of stator teeth and a junction portion extending away therefrom.

A plurality of flexible leads each have a first portion ultrasonically welded directly to a respective one of the junction portions of the plurality of magnet wires. A second portion of each of the plurality of flexible leads extends flexibly away from the first portion (and from the junction portions of the plurality of magnet wires) and is configured for attachment to a respective one of the fixed terminal points.

The bar-wound stator may further include a plurality of junction insulators, such that each junction insulator substantially covers a respective one of the junction portions of the magnet wires and the first portions of the flexible leads. The plurality of flexible leads may be stranded wires, and the plurality of magnet wires may be solid-core wires.

The above features and advantages, and other features and advantages, of the claimed invention are readily apparent from the following detailed description of the best modes and other embodiments for carrying out the invention when taken in connection with the accompanying drawings.

DETAILED DESCRIPTION

Figure 1:
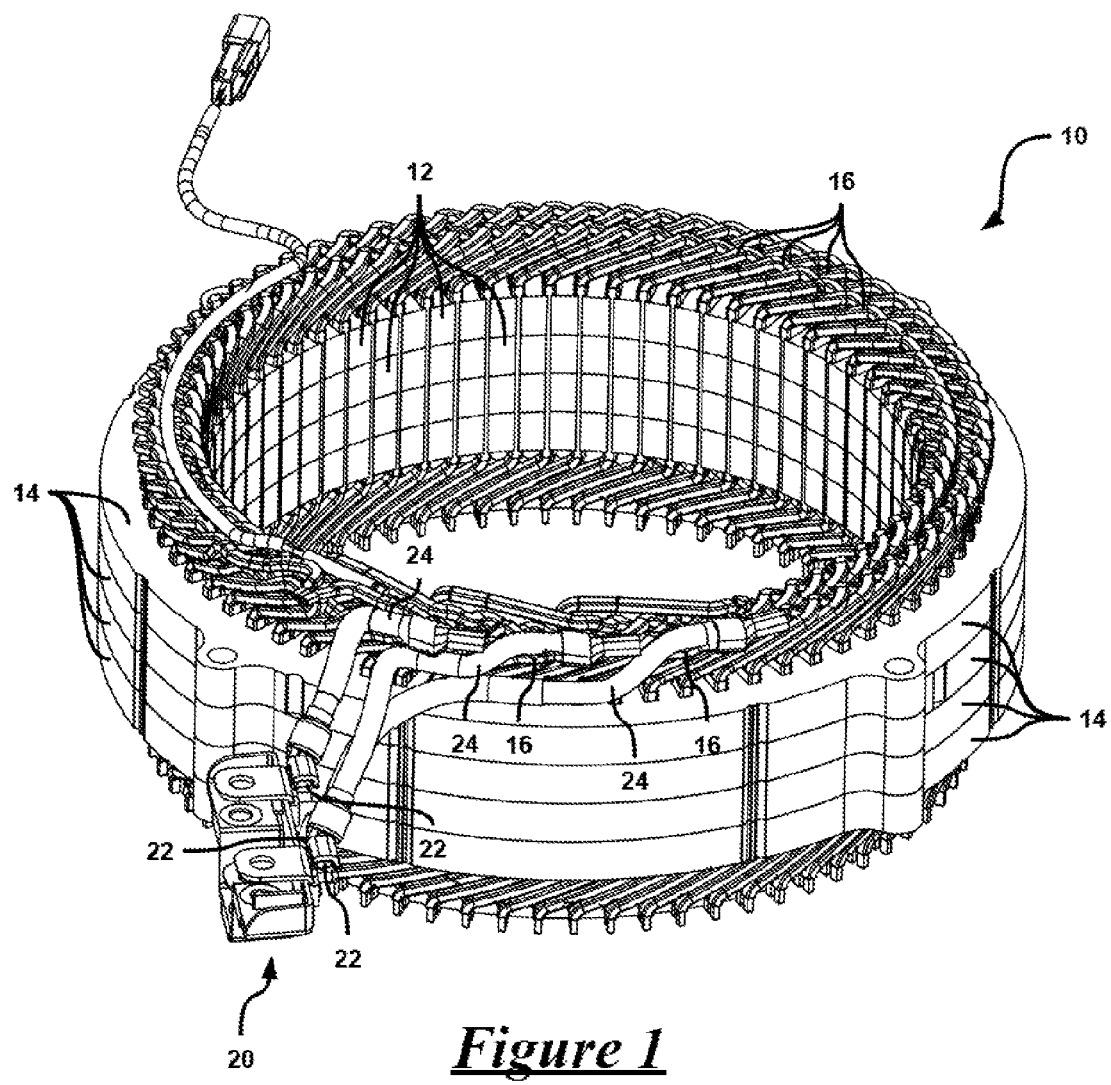
FIG. 1 is a schematic isometric view of a bar-wound stator.

Referring to the drawings, wherein like reference numbers correspond to like or similar components throughout the several figures, there is shown in FIG. 1 a bar-wound stator 10 for an electric machine, such as an electric motor, electric generator, or electric motor/generator. The bar-wound stator 10 may be disposed about a rotor (not shown) which is rotatable about a substantially common axis with the bar-wound stator 10.

While the present invention is described in detail with respect to automotive applications, those skilled in the art will recognize the broader applicability of the invention. Those having ordinary skill in the art will also recognize that terms such as "above," "below," "upward," "downward," et cetera, are used descriptively of the figures, and do not represent limitations on the scope of the invention, as defined by the appended claims.

The bar-wound stator 10 includes a plurality of stator teeth 12. In this configuration of the bar-wound stator 10, the stator teeth 12 are formed in a lamination stack 14, which may be divided into a plurality of layers, as shown in FIG. 1, or may be a single, solid piece. The lamination stack 14 may also provide the support structure for the stator teeth 12, allowing load transfer between the stator teeth 12 and the structures to which the bar-wound stator 10 is attached or mated.

A plurality of magnet wires 16 are disposed with respect to, and wound about, the stator teeth 12. Winding patterns of the bar-wound stator 10 may include distributed integral slot windings, fractional slot windings, or other winding patterns known to those having ordinary skill in the art. Furthermore, any of the winding patterns may use magnet wires 16 with a rectangular cross-section (as shown in FIG. 1) as the winding conductor to increase the slot fill in the stator slots, or may use magnet wires 16 with a circular cross-section.

The bar-wound stator 10 and magnet wires 16 are connectable to a terminal block 20 having a plurality of fixed terminal points 22. The fixed terminal points 22 provide the electrical connections for the bar-wound stator 10 and may be part of, or in communication with, an inverter module. In the configuration shown, the terminal block 20 has three fixed terminal points 22. A plurality of flexible leads 24 provide the connecting link between the magnet wires 16 and the fixed terminal points 22.

Figure 2:
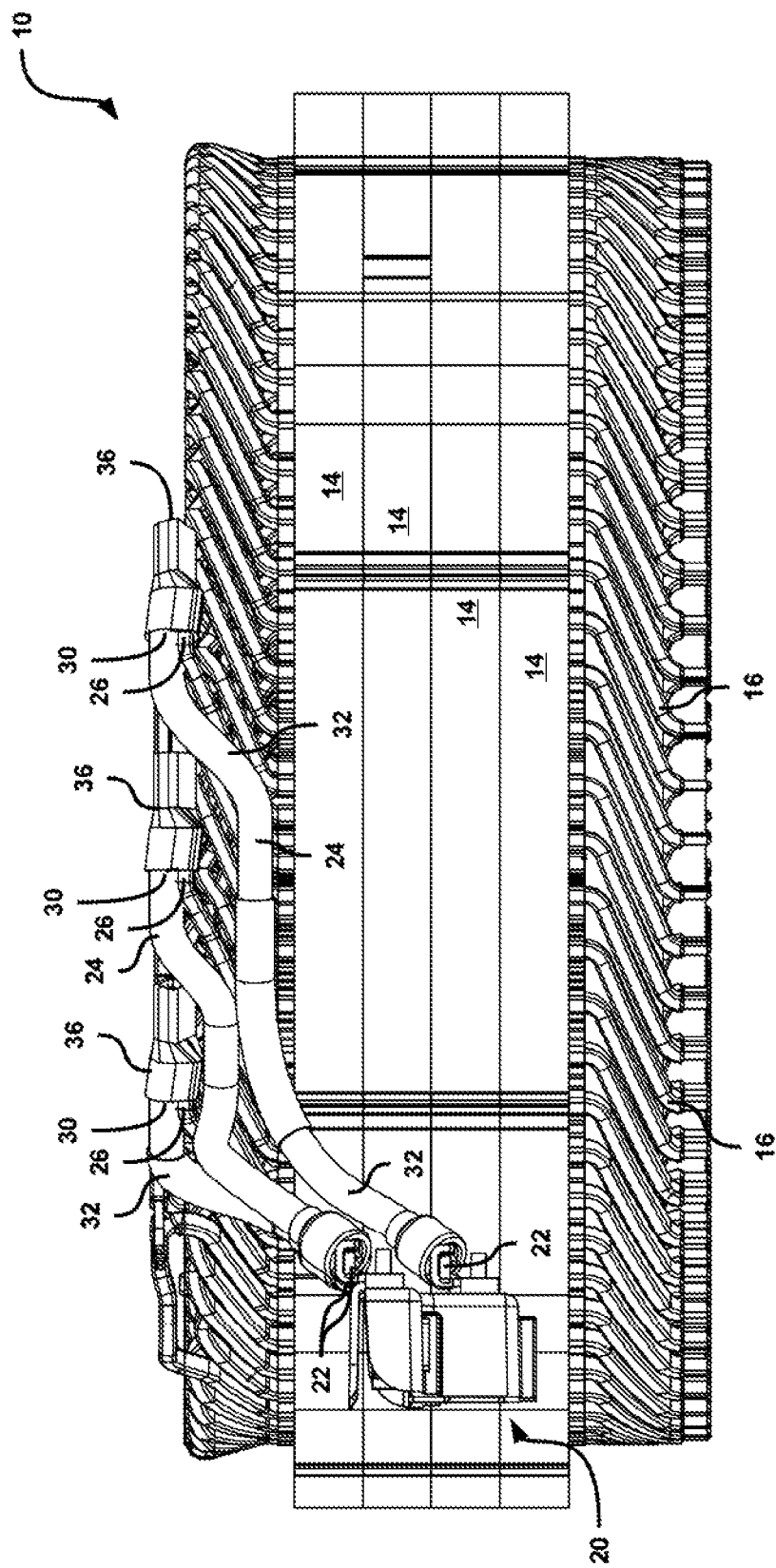
FIG. 2 is a schematic plan view of a portion of the bar-wound stator shown in FIG. 1.

Referring now to FIG. 2, and with continued reference to FIG. 1, a portion of the bar-wound stator 10 is shown from a side or plan view. As viewed FIG. 1, the majority of the magnet wires 16 are wound about at least one of the plurality of stator teeth 12 (hidden from view in FIG. 2. These portions may be referred to as winding portions (not separately numbered in the figures). Each of the plurality of magnet wires 16 also has a junction portion 26 extending away from the winding portion and the stator teeth 12.

The plurality of flexible leads 24 may be stranded wires having multiple internal (often twisted) wires within an insulating layer. The plurality of magnet wires 16 are solid-core wires. As used herein, flexible generally refers to cables or wires which are capable of being bent repeatedly without injury or damage. The flexible leads 24 are flexible, but the magnetic wires 16 are not.

Figure 3:
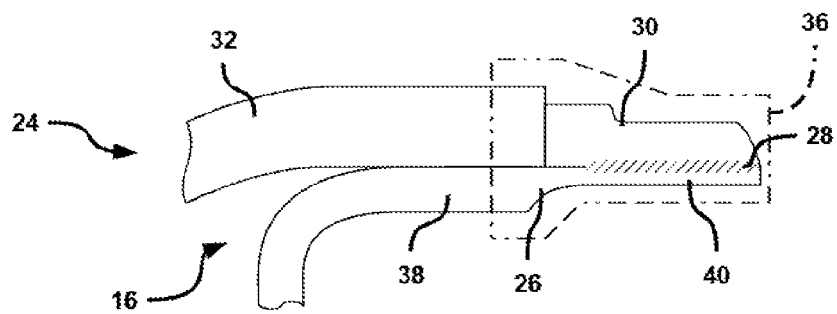
FIG. 3 is a schematic detail view of an ultrasonically-welded connection between a magnet wire and a flexible lead.

As discussed herein, the plurality of flexible leads 24 have a first portion 30 (largely hidden from view in FIGS. 1 and 2) which is ultrasonically welded directly to a respective one of the junction portions 26 of the plurality of magnet wires 16, forming a solid-state weld zone 28 (hidden from view in FIGS. 1 and 2, shown schematically in FIG. 3). This connection provides a conductive contact point for the magnet wires 16. The flexible leads 24 further include a second portion 32 extending flexibly away from the magnet wires 16 and configured for attachment to a respective one of the fixed terminal points 22.

The combined connections of the flexible leads 24 provide electrical communication between the magnet wires 16 and the fixed terminal points 22. During manufacture and assembly of the bar-wound stator 10, the magnet wires 16 are formed such that the junction portions 26 are placed at predetermined locations and orientations. However, variations in the manufacturing processes may result in imprecise location and orientation of the one or more of the junction portions 26. As opposed to forming the magnet wires 16 for a direct connection to the fixed terminal points 22, the flexible leads 24 provide an adjustable connection between the magnet wires 16 and the fixed terminal points 22, which may overcome manufacturing variations. The second portion 32 of the flexible leads 24 extend flexibly away from the junction portions 26 of the magnet wires 16 so that any misalignment or misplacement of the junction portions 26 will not prevent electrically-communicative connection of the magnet wires 16 to the fixed terminal points 22.

As shown in FIG. 2, the bar-wound stator 10 may include a plurality of junction insulators 36. Each of the plurality of junction insulators 36 substantially covers a respective one of the junction portions 26 of the magnet wires 16 and the first portion 30 of the flexible leads 24 attached thereto. The junction insulators 36 block much of the first portions 30 of the flexible leads 24 and the junction portions 26 of the magnet wires 16 from view in FIG. 2.

Referring now to FIG. 3, and with continued reference to FIGS. 1 and 2, one of the connections between the magnet wires 16 and flexible leads 24 is schematically shown. In FIG. 3, the junction insulator 36 is shown in phantom to better view the connection between the flexible lead 24 and the magnet wire 16.

As best viewed in FIG. 3, the junction portions 26 shown each include a body region 38 having a first thickness, and a flat region 40 having a second thickness. The second thickness of the flat region 40 is smaller than the first thickness, such that the flat region 40 provides an increased contact patch or surface compared to the body region 38. The first portions 30 of the flexible leads 24 are ultrasonically welded to a respective one of the flat regions 40, creating a conductive connection therebetween.

In ultrasonic welding, high-frequency ultrasonic acoustic vibrations are locally applied to workpieces that are held together under pressure, to create a solid-state weld. Therefore, the first portion 30 of the flexible lead 24 is attached to the junction portion 26 (or, more specifically, the flat region 40) with no connective bolts, rivets, soldering materials, or adhesives necessary to bind the materials together. Furthermore, the junction portion 26 is not substantially bent, crimped, or deformed around the flexible lead 24 in order to connect the two components.

Alternatively, if the magnet wire 16 had a sufficient cross-sectional width, the junction portion 26 may not include the flat region 40. In such a configuration, the first portion 30 of the flexible lead 24 may be ultrasonically welded directly to the body region 38 without flattening or otherwise altering the first portion 30 of the magnet wire 16. Welding the first portion 30 of the flexible lead 24 directly to the body region 38 without altering the first portion 30 of the magnet wire 16 may remove a process or step from the manufacture and assembly and of the bar-wound stator 10.

As shown in FIGS. 1 and 2, the magnet wires 16 have varied takeoff directions or orientations relative to the fixed terminal points 22. Therefore, the flexible leads 24 provide an adjustable, conductive connection between the inflexible magnet wires 16 and the fixed terminal points 22. Furthermore, as shown in FIG. 3, the junction portions 26 need not include large, cantilever bends in order to mate or connect to the fixed terminal points 22 (not viewable in FIG. 3).

The body region 38 and flat region 40 are both part of the unitary, one-piece magnet wire 16. The flat region 40 may be stamped or otherwise formed at the end of the junction portion 26. In the configuration shown in FIG. 3, the flat region 40 is planar and is substantially parallel to the adjoining body region 38.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A bar-wound stator, comprising:
   a plurality of stator teeth;
   a magnet wire wound about at least one of the plurality of stator teeth;
   a junction portion formed on one end of the magnet wire, wherein the junction portion includes a body region having a first thickness, and a flat region having a second thickness smaller than the first thickness; and
   a flexible lead having a first portion ultrasonically welded directly to the junction portion and a second portion extending flexibly away therefrom, wherein the flexible lead is ultrasonically welded to the flat region.

2. The bar-wound stator of claim 1, wherein the flexible lead is a stranded wire and the magnet wire is a solid-core wire.

3. The bar-wound stator of claim 2, wherein the flat region is substantially coplanar with the body region.

4. The bar-wound stator of claim 3, further comprising an insulator substantially covering at least the flat region of the magnet wire and the first portion of the flexible lead.

5. A bar-wound stator connectable to a plurality of fixed terminal points, comprising:
   a plurality of stator teeth;
   a plurality of magnet wires, each having a winding portion wound about at least one of the plurality of stator teeth and a junction portion extending away therefrom, wherein each of the junction portions includes a body region having a first thickness, and a flat region having a second thickness smaller than the first thickness; and
   a plurality of flexible leads, each having a first portion ultrasonically welded directly to a respective one of the flat regions of the junction portions of the plurality of magnet wires, and a second portion extending flexibly away therefrom and configured for attachment to a respective one of the fixed terminal points.

6. The bar-wound stator of claim 5, further comprising a plurality of junction insulators, wherein each junction insulator substantially covers a respective one of the junction portions of the magnet wires and the first portions of the flexible leads.

7. The bar-wound stator of claim 6, wherein the plurality of flexible leads are stranded wires and the plurality of magnet wires are solid-core wires.

8. The bar-wound stator of claim 7, wherein each of the flat regions is substantially parallel to each respective body region.

* * * * *